(12) United States Patent
Sinzel et al.

(10) Patent No.: US 11,646,462 B2
(45) Date of Patent: May 9, 2023

(54) TRACTION BATTERY FOR AN ELECTRICALLY OPERATED VEHICLE AND TOLERANCE COMPENSATION UNIT

(71) Applicant: AUDI AG, Ingolstadt (DE)

(72) Inventors: Steffen Sinzel, Weinsberg (DE); Dirk Hoefner, Wellheim (DE); Norbert Hornbostel, Talheim (DE)

(73) Assignee: AUDI AG, Ingolstadt (DE)

( * ) Notice: Subject to any disclaimer, the term of this patent is extended or adjusted under 35 U.S.C. 154(b) by 376 days.

(21) Appl. No.: 16/983,170

(22) Filed: Aug. 3, 2020

(65) Prior Publication Data
US 2021/0043989 A1 Feb. 11, 2021

(30) Foreign Application Priority Data
Aug. 5, 2019 (DE) ...................... 10 2019 211 723.6

(51) Int. Cl.
*H01M 10/625* (2014.01)
*H01M 10/613* (2014.01)
*H01M 50/20* (2021.01)

(52) U.S. Cl.
CPC ....... *H01M 10/625* (2015.04); *H01M 10/613* (2015.04); *H01M 50/20* (2021.01); *H01M 2220/20* (2013.01)

(58) Field of Classification Search
CPC ... H01M 10/613; H01M 10/625; H01M 50/20
See application file for complete search history.

(56) References Cited

U.S. PATENT DOCUMENTS

2006/0246350 A1* 11/2006 Takayama ............. H01M 50/50
429/178
2014/0186674 A1* 7/2014 Goesmann ........ H01M 10/0481
429/96

FOREIGN PATENT DOCUMENTS

| DE | 10 2007 007 956 A1 | 8/2008 |
| DE | 10 2011 103 993 A1 | 12/2012 |
| DE | 10 2016 121 254 A1 | 5/2018 |
| DE | 10 2016 222 094 A1 | 5/2018 |
| DE | 10 2017 109 722 A1 | 11/2018 |

OTHER PUBLICATIONS

Examination Report dated May 8, 2020 in corresponding German application No. 10 2019 211 723.6; 18 pages including Machine-generated English-language translation.

* cited by examiner

*Primary Examiner* — Jonathan G Jelsma
(74) *Attorney, Agent, or Firm* — Maier & Maier, PLLC

(57) ABSTRACT

A traction battery for an electrically operated vehicle, having a battery housing having a housing base, on which at least one battery module rests in a heat-conducting manner, which has an installation section, which can be clamped via a threaded bolt on a housing flange of the battery housing, wherein in the clamped state the threaded bolt is screwed together with a housing flange internal thread and the battery module installation section is clamped between a bolt head of the threaded bolt and the housing flange, specifically with a tolerance compensation unit interposed, which is supported between the battery module installation section and a housing flange upper side facing away from the housing base, wherein the tolerance compensation unit has a stop sleeve.

20 Claims, 7 Drawing Sheets

TRACTION BATTERY FOR AN ELECTRICALLY OPERATED VEHICLE AND TOLERANCE COMPENSATION UNIT

FIELD

The disclosure relates to a traction battery for an electrically operated vehicle and a tolerance compensation unit. The disclosure also relates to a method for installing at least one battery module in a battery housing.

BACKGROUND

The traction battery of an electrically operated vehicle has battery cells, which are each assembled as a cell composite into cuboid battery modules. A number of such battery modules can be arranged in a battery housing which is installed, for example, on the lower side of the vehicle floor. The battery modules can be cooled by means of a cooling system arranged outside the battery housing in order to increase the battery operability.

To install the battery module in the battery housing, a battery module installation section can be clamped to a housing flange of the battery housing via a threaded bolt. In the clamped state, the battery module installation section is clamped between a bolt head of the threaded bolt and the housing flange. The screw bolt is screwed together with a housing flange internal thread. In the prior art, the battery module installation section is screwed together flush with the housing flange.

Due to manufacturing and/or component tolerances, there is the problem that air gaps arise between the battery module and the housing base, whereby the heat conduction between the battery module and the housing base is impaired. A thermal paste, using which the air gaps are filled up, provides a remedy. Excessively large air gaps have to be filled with a correspondingly large amount of thermal paste, which increases the weight of the traction battery. In addition, the manufacturing costs increase and reduced efficiency of the cooling results.

Against this background, a generic traction battery is known from DE 10 2016 222 094 A1, in which the battery module installation section is no longer screwed together flush with the housing flange of the battery housing, but rather with a tolerance compensation unit interposed. The tolerance compensation unit is supported in the clamped state between a support surface of the battery module installation section and a housing flange upper side facing away from the housing base. The tolerance compensation unit has a base body supported on the housing flange upper side and a stop sleeve connected in a lift-adjustable manner to the base body via a screw drive. This stop sleeve is supported in the clamped state on the support surface of the battery module installation section. The stop sleeve is in a releasable drive connection (in particular a frictional connection) with the threaded bolt guided by the stop sleeve. During a tolerance compensation procedure, the threaded bolt takes the stop sleeve with it when it is screwed into the housing flange internal thread. In this way, the stop sleeve can be moved from a nonuse position into a support position, in which the stop sleeve is supported on the battery module support surface, specifically by using up a tolerance clearance between the support surface of the battery module installation section and the stop sleeve.

The tolerance compensation unit known from DE 10 2016 222 094 A1 is implemented with a high component expenditure and with a high manufacturing expenditure.

A battery having a plurality of individual battery cells is known from DE 10 2011 103 993 A1. A battery carrier having a tolerance compensation element is known from DE 10 2016 121 254 A1. A battery housing is known from DE 10 2017 109 722 A1.

SUMMARY

An object of the invention is to provide a traction battery and a tolerance compensation unit, which can be implemented in a structurally simpler manner than in the prior art.

The tolerance compensation unit is installable as a separate preinstallation unit on the housing of the battery flange in a preinstallation step while the battery module is still uninstalled, in particular can be plugged on by a simple plug connection. The base body of the tolerance compensation unit has a centering contour, which can interact with a housing-side counter contour. The housing-side counter contour is formed on the housing flange lower side facing toward the housing base. The centering contour is thus functionally and positionally independent of the tolerance compensation system located on the housing flange upper side (i.e., the lift-adjustable stop sleeve). By means of the centering contour according to the invention, the stop sleeve and the housing flange internal thread can be aligned automatically in the screwing direction in the preinstallation step. The tolerance compensation system can be installed in a simple manner automatically on the housing flange by this automatic alignment and the subsequent screwing in of the threaded bolt is free of interference contours.

In a technical implementation, the housing flange can be spaced apart by a free vertical offset from the housing base of the battery housing. The housing flange can preferably be formed on a side wall drawn up from the housing base. With regard to a perfect screw connection, the housing flange can have a threaded passage in which the housing flange internal thread is formed. The threaded passage can protrude by a component height from the housing flange lower side in the direction toward the housing base. In this case, the external circumference of the threaded passage can form the counter contour which interacts with the centering contour of the base body of the tolerance compensation unit. Therefore, in a double function, the threaded passage provides both a perfect thread engagement for the threaded bolt and also the counter contour for correctly located centering of the tolerance compensation unit. The base body of the tolerance compensation unit is thus preferably centered directly with reference to the threaded passage, so that a correctly located alignment of the stop sleeve and the housing flange internal thread is ensured.

In contrast, such a correctly located alignment cannot be readily ensured if the counter contour is formed positionally independent of the threaded passage on the housing flange lower side, for example, as a positioning hole spaced apart from the threaded passage, which is formed in the housing flange and in which the centering contour of the base body engages.

With regard to reducing components, is advantageous if the threaded passage is formed on the housing flange, in particular from of the same material and/or integrally. A press-in nut can be pressed into the material of the thread passage as an insert part, for example in a cold forming process. The press-in nut provides the housing flange internal thread.

Alternatively to the threaded passage formed in the housing flange, any other screw boss can also be provided, in which the internal thread is formed and which protrudes by the component height from the housing flange lower side in the direction of the housing base In this case, the external circumference of the screw boss can form the counter contour, which interacts with the centering contour of the tolerance compensation unit.

It is preferable if the tolerance compensation unit is installable on the housing flange using simple installation technology. Against this background, the tolerance compensation unit can have a plug receptacle. In the preinstallation step, the base body can be plugged onto a housing flange edge in a preinstallation plug-in direction. The preinstallation plug-in direction can preferably extend in parallel to the flange plane of the horizontally aligned housing flange. To implement such a plug connection, the base body can be formed U-shaped in profile. In this case, the U-shaped base body can have a retaining ring arranged on the housing flange upper side and a centering contour arranged on the housing flange lower side, which is connected via a connecting web to the retaining ring. The retaining ring, the connecting web, and the centering contour form a laterally open plug receptacle in the profile, into which the housing flange edge can be plugged during the pre-installation. This enables automated installation of the tolerance compensation unit.

With regard to perfect centering of the tolerance compensation unit, the centering contour of the base body can have a cylindrical side wall. In the assembled state, this wall can encompass the external circumference of the threaded passage. In the preinstallation plug-in direction, the cylindrical side wall can have an open insertion section, through which the housing-side threaded passage is insertable into an interior delimited by the cylindrical side wall. The interior can be delimited in the direction of the housing base by a centering base, from which the cylindrical side wall is drawn up. An opening can be formed in the centering base, which is aligned with the housing flange internal thread in the screwing direction.

To reduce the component weight, it is preferable if the base body of the tolerance compensation unit is made of plastic. To ensure proper functionality of the tolerance compensation unit, it is particularly preferable if a metal threaded sleeve, in particular a steel threaded sleeve, having an internal thread is integrated into the retaining ring of the base body, which is in threaded engagement with the stop sleeve.

By means of the tolerance compensation unit according to the invention, the assembly of the traction battery can be carried out using the process steps described hereinafter: Thus, firstly the battery housing is placed with its housing base on a counter holder of an assembly tool, to avoid sagging of the housing base during the assembly of the traction battery upon the following installation of the battery modules.

The base body of the tolerance compensation unit is subsequently plugged on at each of the screw points of the housing flange in the preinstallation plug-in direction and a thermal paste is applied to the housing base. The battery module is then prepositioned on the housing base with the thermal paste interposed, possibly with a predetermined pressing force. Similarly, the housing base can be supported from below by the action of a counter retaining force, so that sagging of the housing base under the effect of the pressing force is avoided. The battery module pre-positioning takes place with the formation of a predefined, minimal thermal paste gap between the battery module and the housing base.

When the battery module is pre-positioned in the housing base, the tolerance compensation unit is still deactivated. When the tolerance compensation unit is deactivated, the stop sleeve is still in its nonuse position, in which the stop sleeve is spaced apart from the battery module support surface by a tolerance clearance in the battery vertical direction. A screwing procedure subsequently takes place, in which the threaded bolt is guided through the battery module installation section and through the stop sleeve of the tolerance compensation unit and is screwed into the housing flange internal thread.

The internal thread can be formed having a first thread direction, for example, as a left-handed thread, while the screw drive between the external circumference of the stop sleeve and an internal thread of the retaining ring is formed having an opposing second thread direction, for example, as an opposing right-handed thread. Moreover, a driver can be provided on the internal circumference of the stop sleeve, which provides a releasable drive connection, in particular a frictional connection, between the stop sleeve and the threaded bolt guided through the stop sleeve. In this way, the threaded bolt takes the stop sleeve with it into the housing flange internal thread as it is screwed into the housing flange internal thread. During the screwing-in procedure, the stop sleeve is guided from its nonuse position to the stop with the battery module support surface while using up the tolerance clearance. When the support position is reached, the drive connection releases, so that the threaded bolt can be screwed further into the housing flange internal thread decoupled from rotation with the stop sleeve.

In a further embodiment, the battery module can also have support feet on its lower side, which are directly in contact with the battery housing base without the thermal paste interposed. The support feet act as spacers, which provide a predefined thermal paste gap between the housing base of the battery housing and the lower side of the battery module. The thermal paste is injected in an injection step into the thermal paste gap provided between battery module and housing base.

BRIEF DESCRIPTION OF THE DRAWINGS

An exemplary embodiment is described hereinafter on the basis of the appended figures.

In the figures.

DETAILED DESCRIPTION

Figure 1:
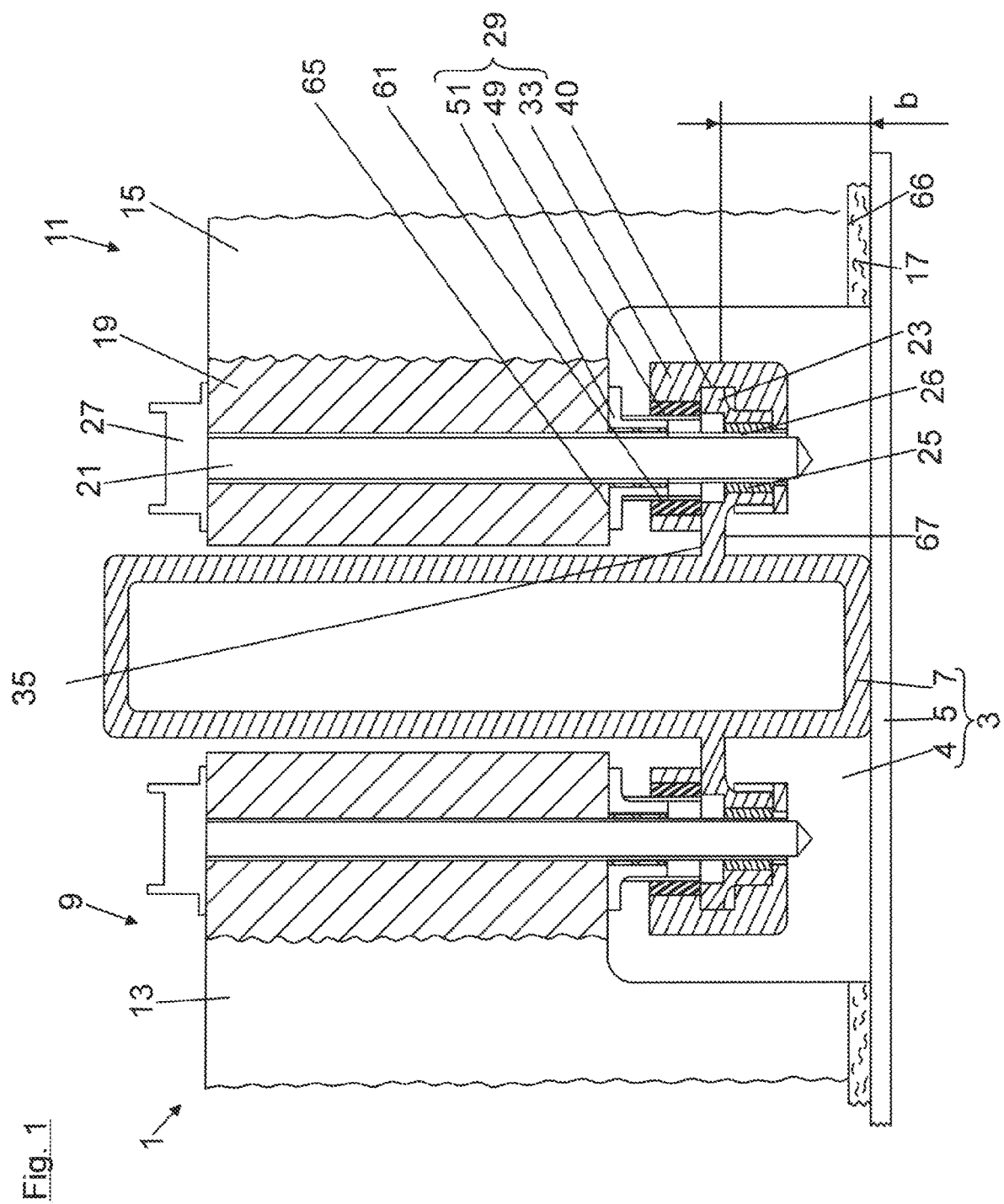
FIG. 1 shows a sectional view of a detail of a traction battery.

A detail of a traction battery 1 for an electrically operated vehicle is shown in FIG. 1 in a sectional view. The traction battery 1 has a battery housing 3, which is formed by a housing interior 4, a housing base 5, and a housing partition 7. The housing base 4 closes the battery housing 3 at the bottom. The housing partition 7 divides the battery housing 3 into two battery module compartments 9, 11, a battery module 13 is arranged in the battery module compartment 9 shown on the left, and a battery module 15 is correspondingly arranged in the battery module compartment 11 shown on the right. The two battery modules 13, 15 rest on the housing base 5 in a heat-conducting manner with a thermal paste 17 interposed. The further description with regard to the fastening of the battery modules 13, 15 in the housing 3 is performed on the basis of the battery module 15 shown on the right. The battery module 13 shown on the left is fastened to the battery housing 3 in the same way as the battery module 15. In addition, the two battery modules 13, 15 are identical in construction.

A housing flange 23 is attached to the housing partition 7, which is spaced apart via a free height offset b from the housing base 5. The housing flange 23 has a threaded passage 22 having an external circumference 43. The threaded passage 22 is made of the same material and is integrally connected to the housing flange 23 and protrudes by a component height k from a housing flange lower side 67. A press-in nut 25 having a housing flange internal thread 26 is inserted into the threaded passage 22. A threaded bolt 21 is screwed into this housing flange internal thread 26, via which an installation section 19 of the battery module 15 is screwed down onto the housing flange 23. The threaded bolt 21 has a bolt head 27, which fixes the installation section 19 on the housing flange 23 with a tolerance compensation unit 29 interposed. The tolerance compensation unit 29 is arranged between the battery module installation section 19 and a housing flange upper side 35.

Figure 2:
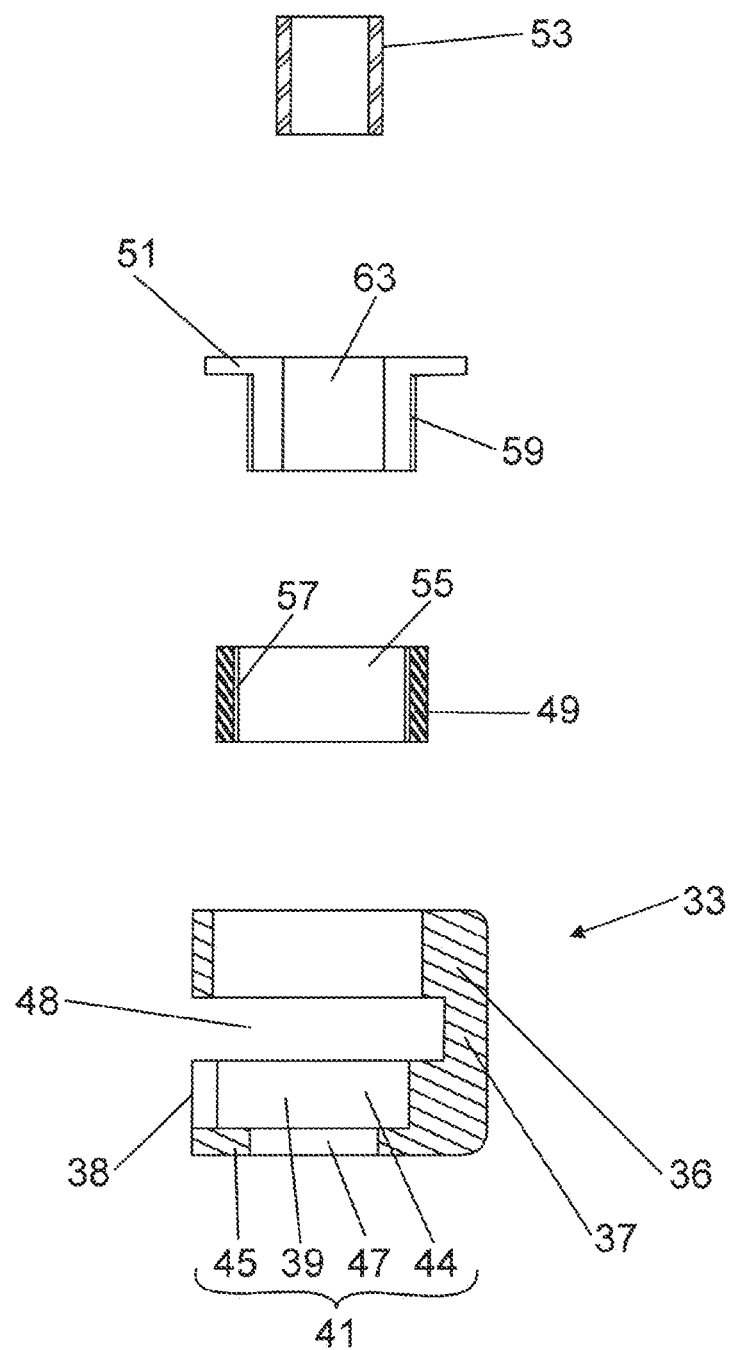
FIG. 2 shows an exploded illustration of a tolerance compensation unit in section.

The tolerance compensation unit 29 and its structure are shown in FIG. 2 in an exploded view. The tolerance compensation unit 29 is a separate preinstallation unit and is constructed from a base body 33, a threaded sleeve 49, and a stop sleeve 51. The base body 33 is formed by a retaining ring 36, a connecting web 37, and a centering contour 41. The base body 33 is U-shaped in profile and provides a plug receptacle 48 between the retaining ring 36 and the centering contour 41. The connecting web 37 connects the retaining ring 36 to the centering contour 41 and closes the plug receptacle 48 on one side. The centering contour 41 is formed by a cylindrical side wall 39, a centering base 45, an insertion section 38, an interior 44, and a centering base through-bore 47. The retaining ring 36 is supported on the housing flange upper side 35 and the centering contour 41 is supported on the housing flange lower side 67.

The centering base 45 delimits the interior 44 in the direction of the housing base 5. A centering contour through opening 47 is provided in the centering base 45, into which the threaded bolt 21 extends.

In addition to the base body 33, the tolerance compensation unit 29 has a threaded sleeve 49 as well as a stop sleeve 51 and a driver 53. The threaded sleeve 49 inserted into the retaining ring 36 has a threaded sleeve through-bore 55, in which a threaded sleeve internal thread 57 is provided. The stop sleeve 51 is screwed into this threaded sleeve internal thread 57 via a stop sleeve external thread 59. The threaded sleeve internal thread 57 and the stop sleeve external thread 59 are left-handed threads and together form a screw drive 61. The stop sleeve 51 is mounted in the retaining ring 36 in a lift-adjustable manner via this screw drive 61.

In addition to the external thread 59, the stop sleeve 51 also has a stop sleeve through-bore 63 into which the driver 53 is inserted. The driver 53 is used to ensure that the threaded bolt 21 guided in the stop sleeve 51 is frictionally connected to the stop sleeve 51 as it is screwed in. The thread of the threaded bolt 21 and the housing flange internal thread 26 are right-handed threads.

An installation method for installing the battery module 15 on the housing flange 23 is described as an example hereinafter on the basis of FIGS. 3 to 6. After completion of this installation method, the battery module 15 is fastened in its final position on the housing flange 23.

Figure 3:
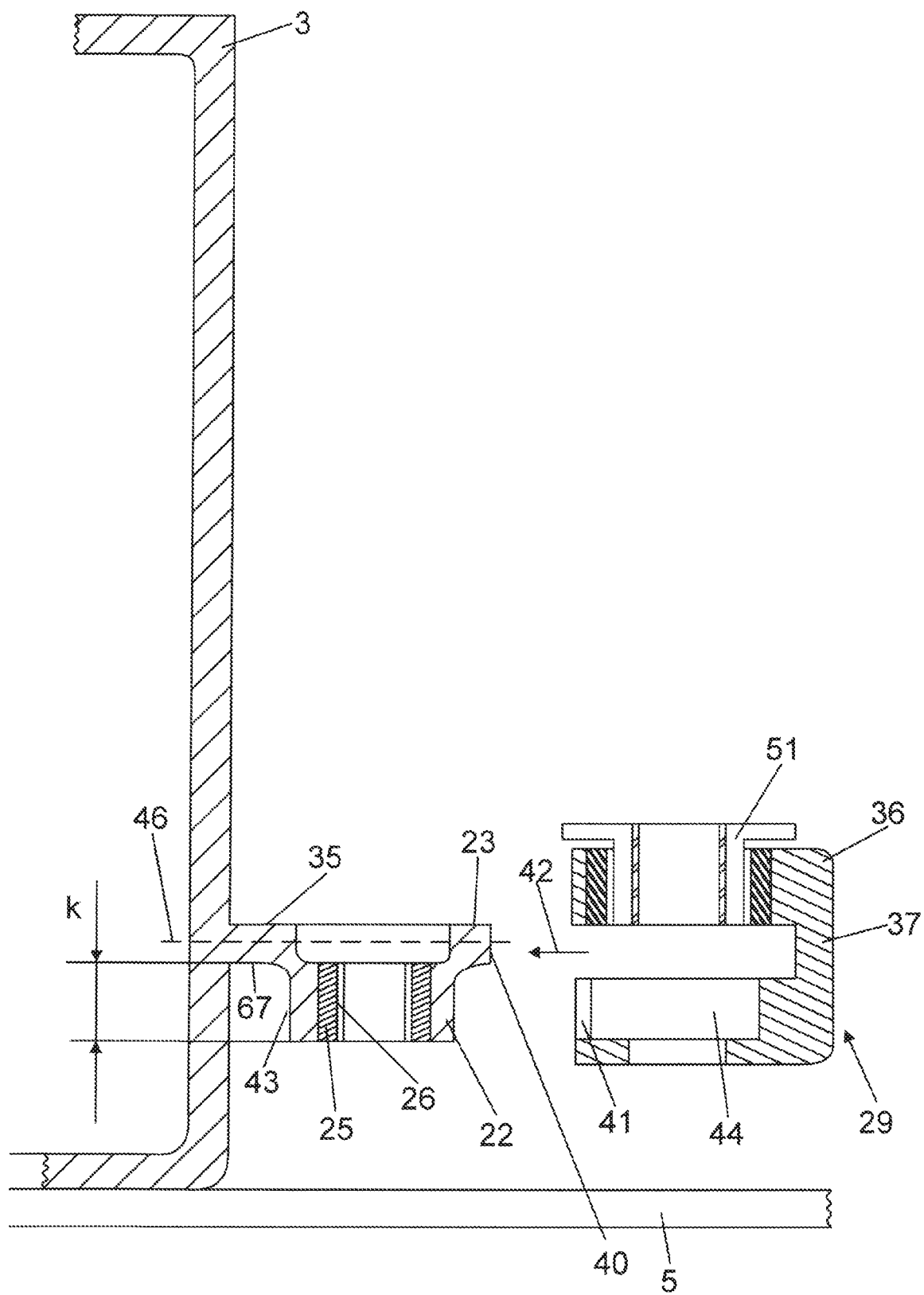
FIG. 3 shows a sectional view of an installation sequence of a battery module in a battery housing.

FIG. 3 shows the tolerance compensation unit 29 before it is plugged onto the housing flange 23 in the preinstallation step. The plugging on takes place in the preinstallation direction 42, which extends in parallel to the flange plane 46. When plugged onto the housing flange 23 and the external circumference 43, the insertion section 38 is positioned on the external circumference 43. The centering contour 41 is then pushed manually or automatically over the external circumference 43, wherein the cylindrical side wall 39 is first elastically deformed radially outward. At the end of the plugging on, the cylindrical side wall 39 deforms back into its starting state, so that the tolerance compensation unit 29 engages on the external circumference 43. The external circumference 43 interacts with the centering contour 41 in such a way that the stop sleep 51 and the housing flange internal thread 26 are aligned in the screwing direction of the threaded bolt 21. This avoids the interfering contours that can make it difficult to screw in the threaded bolt 21.

Figure 4:
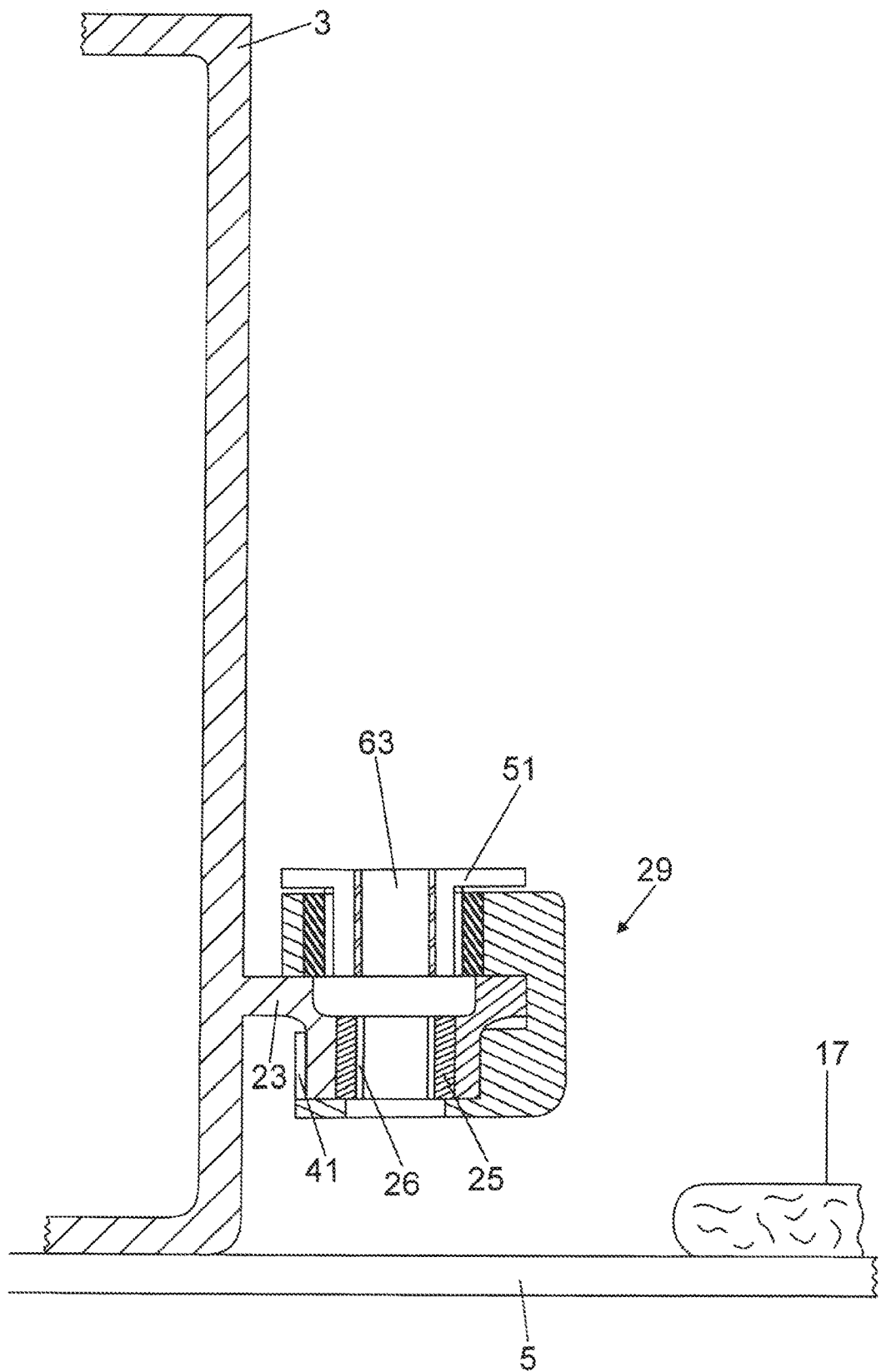
FIG. 4 shows a sectional view of an installation sequence of a battery module in a battery housing.

FIG. 4 shows the preinstalled tolerance compensation unit 29, wherein the axes of the stop sleeve 51 and the housing flange internal thread 26 are aligned with one another. In addition, the thermal paste 17 is applied to the housing base 5.

Figure 5:
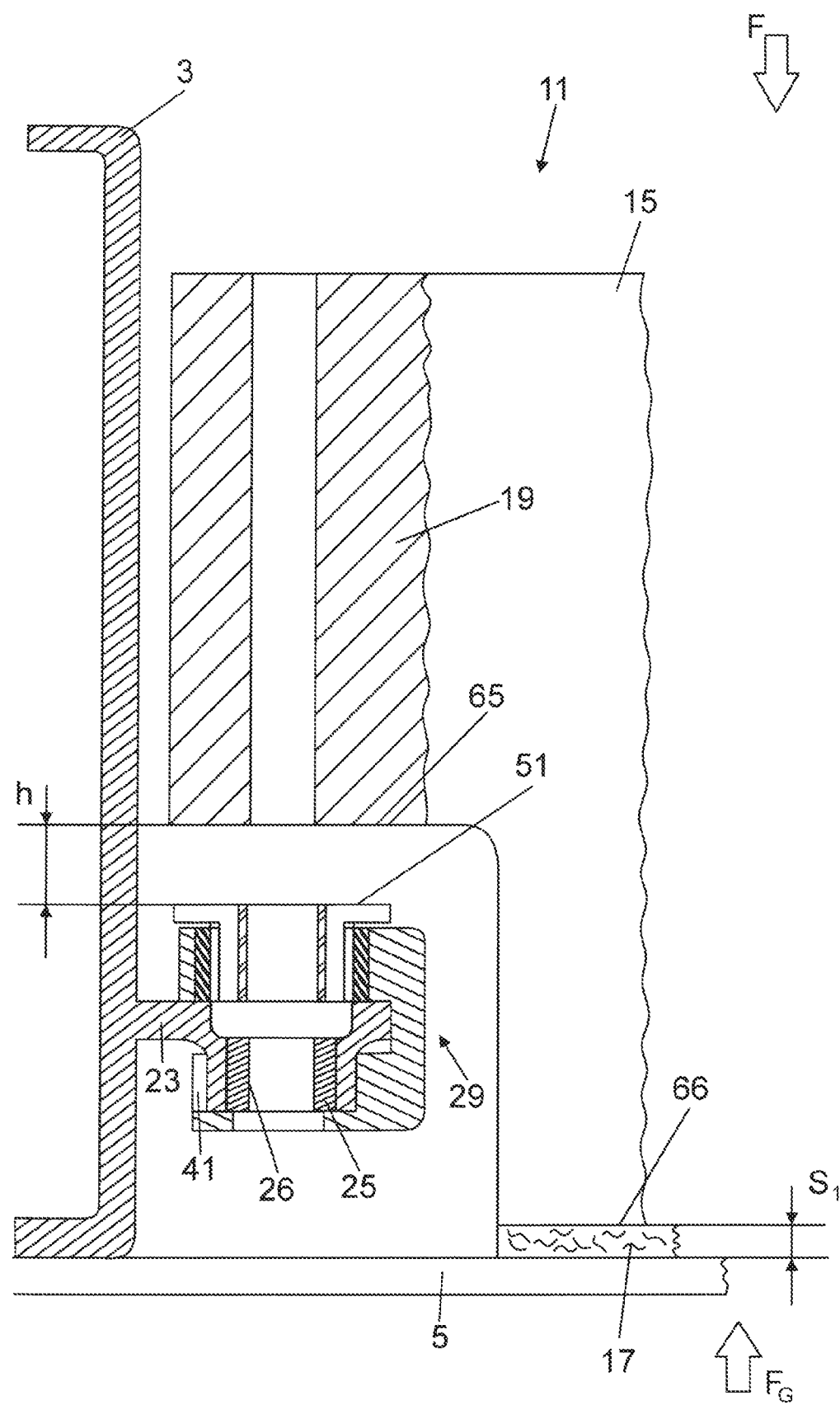
FIG. 5 shows a sectional view of an installation sequence of a battery module in a battery housing.

In FIG. 5, the battery module 15 is inserted into the battery module compartment 11. The mounting section 19 does not rest on the tolerance compensation unit 29. Instead, the tolerance clearance h is established between the installation section 19 and the stop sleeve 51. The battery module 15 rests with its battery module lower side 66 on the thermal paste 17 and is pressed against the housing base 5 with a pressing force F. Similarly, a counter retaining force $F_G$ acts from below against the housing base 5 and thus against the pressing force F. The counter retaining force $F_G$ prevents sagging of the housing base 5 under the effect of the pressing force F. Subsequently, the threaded bolt 21 is inserted through the installation section 19 into the stop sleeve 51 until the threaded bolt 21 abuts the thread beginning of the housing flange internal thread 26. The threaded bolt 21 is subsequently screwed into the housing flange internal thread 26.

When the threaded bolt 21 is screwed in, the frictional connection provided by the driver 53 ensures that the stop sleeve 51 follows the screwing-in movement of the threaded bolt 21. As already explained, the threaded sleeve internal thread 57 and the stop sleeve external thread 59 are left-handed threads and the thread of the threaded bolt 21 and the housing flange internal thread 26 are right-handed threads. Therefore, the stop sleeve 51 is screwed out of the threaded sleeve 49 in the direction of the battery module support surface 65 when the threaded bolt 21 is screwed in. When the threaded bolt 21 is screwed in, the stop sleep 51 is screwed out of the threaded sleeve internal thread 57 from a nonuse position until the stop sleep 51 abuts the battery module support surface 65 in a support position. As a result, the tolerance clearance h is bridged by the stop sleeve 51.

Figure 6:
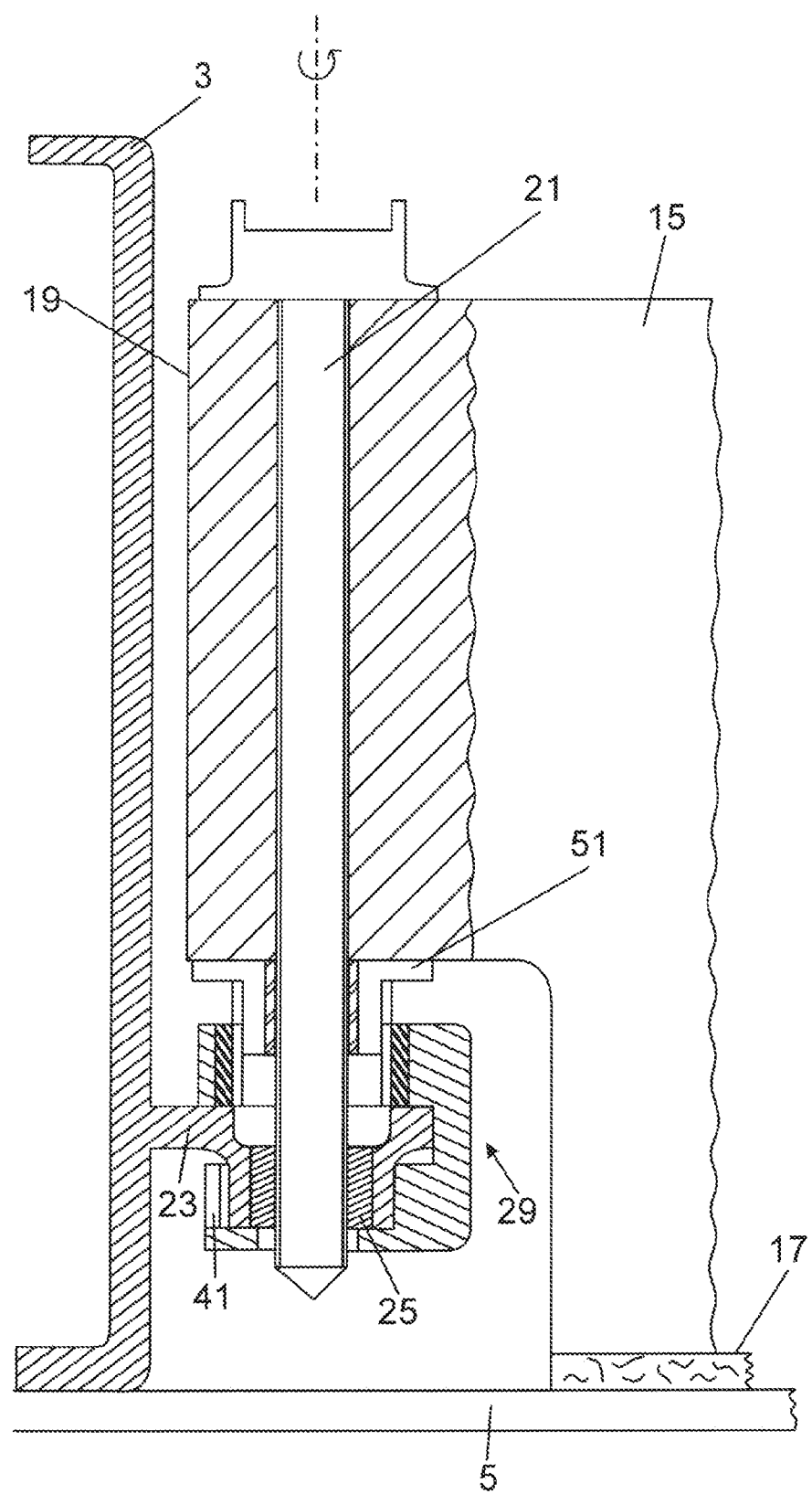
FIG. 6 shows a sectional view of an installation sequence of a battery module in a battery housing.

The threaded bolt 21 is subsequently screwed further into the housing flange internal thread 26. The stop sleeve 51 no longer rotates with the threaded bolt 21, since the stop sleeve 51 already abuts the battery module support surface 65 and therefore the torque applied when screwing in exceeds the frictional force of the frictional connection. The threaded bolt 21 is screwed into the housing flange internal thread 26 until the battery module 15 is fixed in its final position on the housing flange 23. This final position as shown in FIG. 6.

Figure 7:
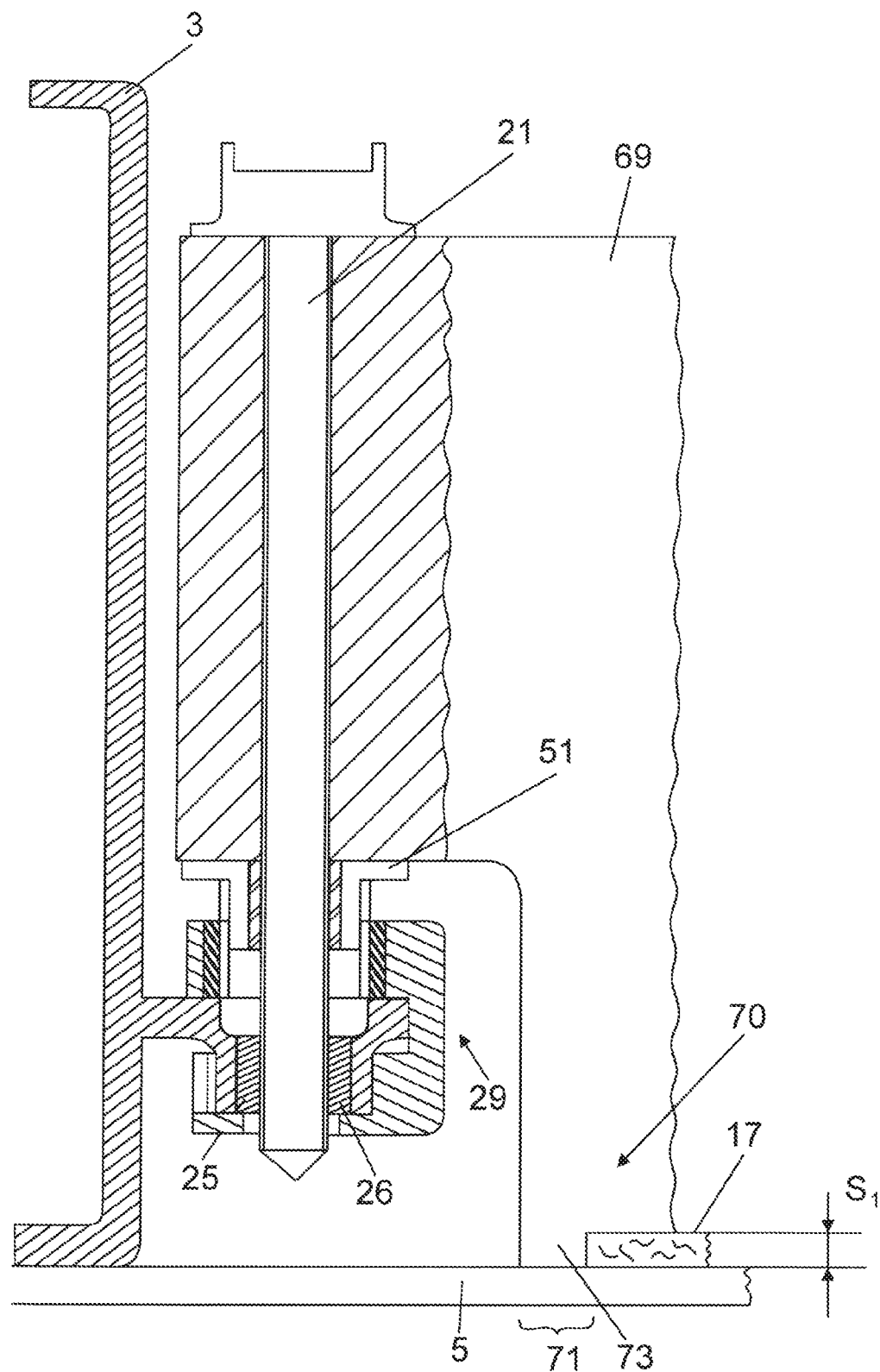
FIG. 7 shows a sectional view of a detail of a further traction battery.

FIG. 7 shows an alternative form of installation of a battery module 69 on the housing flange 23. The battery module 69 has a support foot 73 on its battery module lower side 70 in a support foot region 71. The battery module 69 rests directly on the housing base 5 in this support leg region 71 without the thermal paste 17 being interposed. In the remaining regions of the lower side 70, on the other hand, a thermal paste gap $S_1$ is provided, into which the thermal paste 17 can be introduced. In this alternative form of installation, the thermal paste 17 is only introduced after the fixing of the battery module 69 on the housing flange 23.

The invention claimed is:

1. A traction battery for an electrically operated vehicle, comprising:
a battery housing having a housing base, on which at least one battery module rests in a heat-conducting manner, which has an installation section, which can be clamped via a threaded bolt on a housing flange of the battery housing, wherein in a clamped state the threaded bolt is screwed together with a housing flange internal thread and the battery module installation section is clamped between a bolt head of the threaded bolt and the housing flange with a tolerance compensation unit interposed, which is supported between the battery module installation section and a housing flange upper side facing away from the housing base,
wherein the tolerance compensation unit has a stop sleeve which is lift-adjustable via a screw drive and which can be supported on the battery module installation section, and wherein the threaded bolt is guided through the stop sleeve, and wherein during a tolerance compensation procedure, the threaded bolt takes along the stop sleeve as the threaded bolt is screwed into the housing flange internal thread, so that the stop sleeve can be moved from a nonuse position, while using up a tolerance clearance between the stop sleeve and the battery module, into a support position, in which the stop sleeve is supported on the battery module,
wherein the tolerance compensation unit is a separate preinstallation unit, which is fastenable in a preinstallation step on the housing flange, in that the tolerance compensation unit has a centering contour that interacts with a housing-side counter contour in such a way that, in the preinstallation step, the stop sleeve and the housing flange internal thread can be aligned automatically in a screwing direction, and in that the centering contour of the tolerance compensation unit and the housing-side counter contour are arranged on the housing flange lower side facing toward the housing base.

2. The traction battery as claimed in claim 1, wherein in the clamped state, the stop sleeve of the tolerance compensation unit is supported on a battery module support surface of the battery module installation section, and/or in that the tolerance compensation unit has a base body supported on the housing flange upper side, in which the stop sleeve is mounted so the stop sleeve is lift-adjustable via the screw drive, and/or
wherein the stop sleeve has a releasable drive connection with the threaded bolt guided by the stop sleeve, and in the tolerance compensation procedure, the threaded bolt carries along the stop sleeve as the threaded bolt is screwed into the housing flange internal thread, so that the stop sleeve is movable, while using up the tolerance clearance, into the support position, in which the stop sleeve is supported on the battery module support surface.

3. The traction battery as claimed in claim 2, wherein the base body of the tolerance compensation unit has a plug receptacle, so that in the preinstallation step, the base body can be plugged manually or automatically onto a housing flange edge in a preinstallation direction, the preinstallation direction being aligned in parallel to a flange plane of the housing flange.

4. The traction battery as claimed in claim 3, wherein the base body of the tolerance compensation unit is U-shaped in profile and has a retaining ring arranged on the housing flange upper side, which is in threaded engagement with the stop sleeve via the screw drive, having the centering contour arranged on the housing flange lower side, and having a connecting web which connects the centering contour to the retaining ring, and
wherein a threaded sleeve having internal threading is inserted into the retaining ring of the base body as an insert part, which is in threaded engagement with the stop sleeve to form the screw drive.

5. The traction battery as claimed in claim 4, wherein the centering contour has a centering base from which the cylindrical side wall is drawn up and which delimits the interior in the direction of the housing base, and
wherein a centering base through-bore is formed in the centering base, which is aligned in the screwing direction with the housing flange internal thread.

6. The traction battery as claimed in claim 3, wherein the centering contour of the base body has a cylindrical side wall which comprises an external circumference of the threaded passage, and
wherein the cylindrical side wall has an open insertion section in the preinstallation plug-in direction, through which the threaded passage is insertable into an interior delimited by the cylindrical side wall with elastic deformation of the cylindrical side wall of the centering contour.

7. The traction battery as claimed in claim 2, wherein the housing flange is spaced apart by a free height offset from the housing base of the battery housing, and/or
wherein the housing flange has a threaded passage or a screw boss, in which the housing flange internal thread is formed.

8. The traction battery as claimed in claim 2, wherein the centering contour of the base body has a cylindrical side wall which comprises an external circumference of the threaded passage, and
wherein the cylindrical side wall has an open insertion section in the preinstallation plug-in direction, through which the threaded passage is insertable into an interior delimited by the cylindrical side wall with elastic deformation of the cylindrical side wall of the centering contour.

9. The traction battery as claimed in claim 1, wherein the housing flange is spaced apart by a free height offset from the housing base of the battery housing, and/or
wherein the housing flange has a threaded passage or a screw boss, in which the housing flange internal thread is formed.

10. The traction battery as claimed in claim 9, wherein an external circumference of the threaded passage forms the counter contour, which interacts with the centering contour of the base body of the tolerance compensation unit, and/or
wherein the centering contour of the tolerance compensation unit can be brought manually or automatically and with elastic deformation into a snap connection with the housing-side counter contour in the preinstallation step.

11. The traction battery as claimed in claim 10, wherein the threaded passage is formed on the housing flange and a press-in nut is pressed into the threaded passage as an insert part on an internal circumference in a cold forming process, which provides the housing flange internal thread.

12. The traction battery as claimed in claim 10, wherein the base body of the tolerance compensation unit has a plug receptacle, so that in the preinstallation step, the base body can be plugged manually or automatically onto a housing flange edge in a preinstallation direction, the preinstallation direction being aligned in parallel to a flange plane of the housing flange.

13. The traction battery as claimed in claim 10, wherein the centering contour of the base body has a cylindrical side wall which comprises the external circumference of the threaded passage, and
wherein the cylindrical side wall has an open insertion section in the preinstallation plug-in direction, through which the threaded passage is insertable into an interior delimited by the cylindrical side wall with elastic deformation of the cylindrical side wall of the centering contour.

14. The traction battery as claimed in claim 9, wherein the threaded passage is formed on the housing flange and a press-in nut is pressed into the threaded passage as an insert part on an internal circumference in a cold forming process, which provides the housing flange internal thread.

15. The traction battery as claimed in claim 14, wherein the base body of the tolerance compensation unit has a plug receptacle, so that in the preinstallation step, the base body can be plugged manually or automatically onto a housing flange edge in a preinstallation direction, the preinstallation direction being aligned in parallel to a flange plane of the housing flange.

16. The traction battery as claimed in claim 14, wherein the centering contour of the base body has a cylindrical side wall which comprises an external circumference of the threaded passage, and
wherein the cylindrical side wall has an open insertion section in the preinstallation plug-in direction, through which the threaded passage is insertable into an interior delimited by the cylindrical side wall with elastic deformation of the cylindrical side wall of the centering contour.

17. The traction battery as claimed in claim 9, wherein the base body of the tolerance compensation unit has a plug receptacle, so that in the preinstallation step, the base body can be plugged manually or automatically onto a housing flange edge in a preinstallation direction, the preinstallation direction being aligned in parallel to a flange plane of the housing flange.

18. The traction battery as claimed in claim 9, wherein the centering contour of the base body has a cylindrical side wall which comprises an external circumference of the threaded passage, and
wherein the cylindrical side wall has an open insertion section in the preinstallation plug-in direction, through which the threaded passage is insertable into an interior delimited by the cylindrical side wall with elastic deformation of the cylindrical side wall of the centering contour.

19. The traction battery as claimed in claim 1, wherein the centering contour of the base body has a cylindrical side wall which comprises an external circumference of the threaded passage, and
wherein the cylindrical side wall has an open insertion section in the preinstallation plug-in direction, through which the threaded passage is insertable into an interior delimited by the cylindrical side wall with elastic deformation of the cylindrical side wall of the centering contour.

20. A tolerance compensation unit comprising:
a traction battery with a battery housing having a housing base, on which at least one battery module rests in a heat-conducting manner, which has an installation section, which can be clamped via a threaded bolt on a housing flange of the battery housing, wherein in a clamped state the threaded bolt is screwed together with a housing flange internal thread and the battery module installation section is clamped between a bolt head of the threaded bolt and the housing flange with a tolerance compensation unit interposed, which is supported between the battery module installation section and a housing flange upper side facing away from the housing base,
wherein the tolerance compensation unit has a stop sleeve which is lift-adjustable via a screw drive and which can be supported on the battery module installation section, and wherein the threaded bolt is guided through the stop sleeve, and wherein during a tolerance compensation procedure, the threaded bolt takes along the stop sleeve as the threaded bolt is screwed into the housing flange internal thread, so that the stop sleeve can be moved from a nonuse position, while using up a tolerance clearance between the stop sleeve and the battery module, into a support position, in which the stop sleeve is supported on the battery module,
wherein the tolerance compensation unit is a separate preinstallation unit, which is fastenable in a preinstallation step on the housing flange, in that the tolerance compensation unit has a centering contour that interacts with a housing-side counter contour in such a way that, in the preinstallation step, the stop sleeve and the housing flange internal thread can be aligned automatically in a screwing direction, and in that the centering contour of the tolerance compensation unit and the housing-side counter contour are arranged on the housing flange lower side facing toward the housing base.

* * * * *